US011729177B2

(12) United States Patent
Jarvis et al.

(10) Patent No.: US 11,729,177 B2
(45) Date of Patent: Aug. 15, 2023

(54) SYSTEM AND METHOD FOR AUTHENTICATION

(71) Applicant: Capital One Services, LLC, McLean, VA (US)

(72) Inventors: Daniel Jarvis, Vienna, VA (US); Andrew Beck, Vienna, VA (US); Manuel Vicente Vivo, Madrid (ES)

(73) Assignee: Capital One Services, LLC, McLean, VA (US)

( * ) Notice: Subject to any disclaimer, the term of this patent is extended or adjusted under 35 U.S.C. 154(b) by 360 days.

(21) Appl. No.: 16/863,089

(22) Filed: Apr. 30, 2020

(65) Prior Publication Data

US 2021/0344681 A1 Nov. 4, 2021

(51) Int. Cl.
*H04L 9/40* (2022.01)
*G06F 21/62* (2013.01)
*G06F 21/44* (2013.01)

(52) U.S. Cl.
CPC ............ *H04L 63/102* (2013.01); *G06F 21/44* (2013.01); *G06F 21/6245* (2013.01); *H04L 63/08* (2013.01)

(58) Field of Classification Search
CPC ....... H04L 63/102; H04L 63/08; G06F 21/44; G06F 21/6245
See application file for complete search history.

(56) References Cited

U.S. PATENT DOCUMENTS

| 7,934,258 | B2 | 4/2011 | Wahl |
| 8,793,758 | B2 | 7/2014 | Raleigh et al. |
| 9,038,151 | B1 | 5/2015 | Chua et al. |
| 9,374,369 | B2 | 6/2016 | Mahaffey et al. |
| 2011/0055913 | A1* | 3/2011 | Wong .................... H04L 63/102 726/5 |
| 2015/0381621 | A1* | 12/2015 | Innes ................... H04W 12/069 726/7 |
| 2017/0109509 | A1* | 4/2017 | Baghdasaryan ....... G06Q 20/40 |
| 2017/0346815 | A1* | 11/2017 | Andrews ............... H04L 9/3231 |
| 2019/0319939 | A1* | 10/2019 | Hamel ................ H04L 63/0807 |
| 2021/0326432 | A1* | 10/2021 | Kaidi .................... H04L 9/3226 |

* cited by examiner

*Primary Examiner* — Harris C Wang
(74) *Attorney, Agent, or Firm* — Banner & Witcoff, Ltd.

(57) ABSTRACT

A computer-implemented method includes receiving an authentication request from an external device for authenticating an application on the external device, and receiving a plurality of information items in connection with the authentication request from a plurality of different externally residing information sources. The authentication request is then evaluated, which includes evaluating each of the plurality of information items, to determine an authentication status of the application. Based on the authentication status, the device is then selectively permitted access to private information through the application. A computer system and/or machine-readable media may be provided to perform some or all steps of the method.

18 Claims, 6 Drawing Sheets

SYSTEM AND METHOD FOR AUTHENTICATION

FIELD OF THE INVENTION

This disclosure relates to authentication for providing access to external devices, and more specifically to a system and method for authenticating applications and software development kits (SDKs) attempting to access a server.

BACKGROUND

Many servers and other devices require or benefit from authentication of devices, applications, and software development kits (SDKs) embedded within such applications for detecting whether a device is compromised, i.e., tampering with devices and/or software, malicious software, malicious intentional use, etc. In particular, authentication is beneficial for devices and software attempting to access an application programming interface (API) for a web server. A wide variety of systems, methods, and software exist for such authentication. Such existing techniques include many drawbacks and limitations, and many such techniques are not compatible for use with authenticating SDKs. For example, some existing techniques can be easily reverse engineered, which increases vulnerability. As another example, some existing techniques rely on checking binary size for applications, which can be unpredictable and inaccurate. As another example, some existing techniques are required to sacrifice speed for accuracy, thereby reducing the quality of the experience for the legitimate user. As a further example, some existing techniques use scoring and weighting systems, but lack the ability to self-optimize or improve on the scoring and weighting systems being used.

The present disclosure is provided to address this need and other needs in existing authentication technologies. A full discussion of the features and advantages of the present invention is deferred to the following detailed description, which proceeds with reference to the accompanying drawings.

BRIEF SUMMARY

General aspects of the present disclosure relate to authentication of devices, applications, and SDKs attempting to access a server, and in particular a server API for a web server.

Aspects of the disclosure relate to a computer-implemented method that includes receiving an authentication request from an external device for authenticating an application on the external device. A plurality of information items are received in connection with the authentication request from a plurality of different externally residing information sources. These information items may include information such as device fingerprinting information for the external device, malware detection information for the external device, and access restriction circumvention information for the external device, among others. The authentication request is then evaluated, which includes evaluating each of the plurality of information items, to determine an authentication status of the application. Based on the authentication status, the device is then selectively permitted access to private information through the application. The application may include a software development kit (SDK) that is also authenticated by the method.

According to one aspect, the computing device is an API server and wherein the private information comprises financial information of a user of the external device.

According to another aspect, the plurality of information items are evaluated using a scoring system to determine an authentication status of the application, and the method further includes issuing an authentication token to the external device, where the authentication token includes token information reflecting the authentication status. In one configuration, the method also includes receiving historical information regarding past authentication requests and modifying the scoring system based on the historical information. In another configuration, the scoring system is configured such that the authentication status is determined to be unauthorized based on at least one of the device fingerprinting information and the malware detection information, and the external device is not permitted access to the private information based on the unauthorized authentication status.

According to a further aspect, the external device is permitted access to the private information prior to evaluation of all of the plurality of information items, and wherein the method further comprises modifying the authentication status after the external device is permitted access to the private information. In one configuration, this may also include modifying a degree of the access to the private information by the external device based on modifying the authentication status.

According to yet another aspect, a first item of the plurality of information items is received from a first externally residing information source, and a second item of the plurality of information items is received after the first item from a second externally residing information source, wherein the external device is permitted access to the private information after evaluation of the first item and before evaluation of the second item. In one configuration, the authentication status may be modified after the external device is permitted access to the private information and after evaluation of the second item, and a degree of the access to the private information by the external device may also be modified based on modifying the authentication status. In another configuration, access to a first portion of the private information is permitted without evaluation of the second item, and access to a second portion of the private information is only permitted after evaluation of the second item.

According to a still further aspect, a selected degree of access to the private information may be selected based on the authentication status, where the external device is permitted to have the selected degree of access to the private information.

According to an additional aspect, at least one of the externally residing information sources resides on the external device, such that at least one of the plurality of information items is received from the external device. In one configuration, the majority or all of the externally residing information sources resides on the external device.

According to another aspect, instructions are received from a third party associated with the application to determine a degree of access to selectively provide to the external device when the access restriction circumvention information indicates that access restriction for the external device has been circumvented.

Additional aspects of the disclosure relate to a computer-implemented method in which an authentication request is received from an external device for authenticating an application on the external device, and the authentication request is evaluated based on a plurality of information items from a plurality of different externally residing information sources, the plurality of information items including at least one characteristic of the external device. An authentication token is issued to the external device based on the evaluating the authentication request. Login information for a user of the external device is received, subsequent to issuing the authentication token, and a login token is issued to the external device in response to the receiving the login information. A request for access to private information and a confirmation of the authentication token and the login token are received, and the external device is selectively permitted access to the private information through the application, based on the confirmation of the authentication token and the login token.

According to one aspect, the at least one characteristic of the external device includes at least device fingerprinting information for the external device, malware detection information for the external device, and access restriction circumvention information for the external device.

According to another aspect, the authentication request is evaluated by evaluating the plurality of information items using a scoring system to determine an authentication status of the application, and the authentication token includes token information reflecting the authentication status.

According to a further aspect, the plurality of information items are evaluated using a scoring system to determine an authentication status of the application, and the method also includes receiving historical information regarding past authentication requests and modifying the scoring system based on the historical information.

Further aspects of the disclosure relate to a computer-implemented method in which an authentication request is received from an external device for authenticating an application on the external device, and a plurality of information items are received from a plurality of different externally residing information sources, with the plurality of information items including at least one characteristic of the external device. The authentication request is evaluated, which includes evaluating each of the plurality of information items using a scoring system, to determine an authentication status of the application. An authentication token is issued to the external device, where the authentication token includes token information reflecting the authentication status and indicating a degree of certainty that the application or the external device is compromised based on the evaluating each of the plurality of information items. Login information for a user of the external device is received subsequent to issuing the authentication token, and a login token is issued to the external device in response to the receiving the login information. A request for access to private information and a confirmation of the authentication token and the login token are then received, and the external device is provided a selected degree of access to the private information through the application, based on the authentication status and the degree of certainty that the application or the external device is compromised.

According to one aspect, the plurality of information items includes access restriction circumvention information, and instructions are received from a third party associated with the application, which determine the selected degree of access to provide to the external device when the access restriction circumvention information indicates that access restriction for the external device has been circumvented.

Other aspects of the disclosure relate to a computer system including one or more processors and memory storing instructions that, when executed by the one or more processors, cause the system to perform some or all of the method steps described above. Still other aspects of the disclosure relate to a non-transitory machine-readable medium storing instructions that, when executed by one or more processors, cause the one or more processors to perform some or all of the method steps described above.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
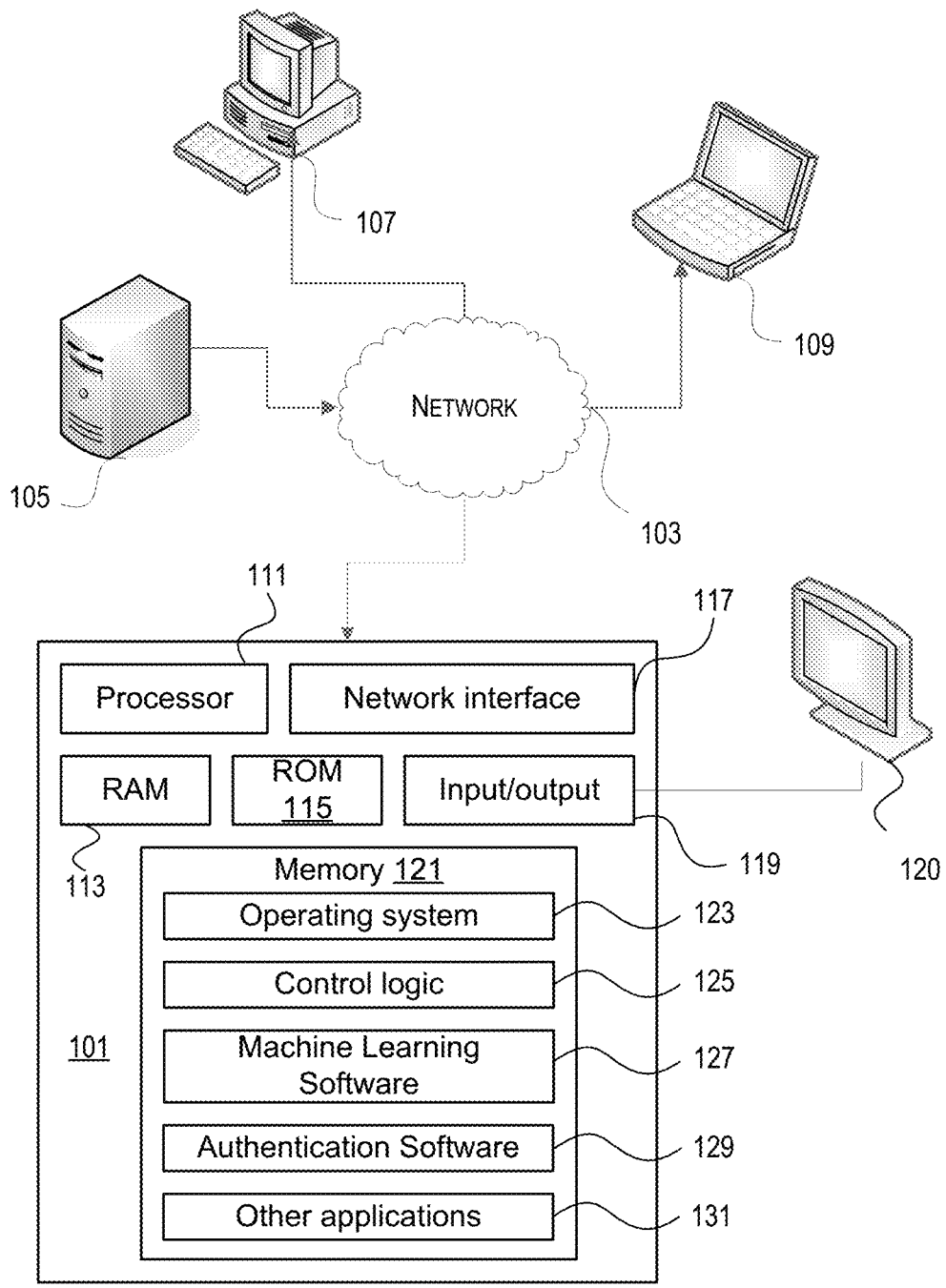
FIG. 1 depicts an example of a computing device that may be used in implementing one or more aspects of the disclosure in accordance with one or more illustrative aspects discussed herein.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Aspects of the disclosure relate to systems and methods of authenticating an application and/or an SDK operating within or otherwise in conjunction with the application. Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, authentication software 129, and other applications 131. Control logic 125 may be incorporated in and may be a part of machine learning software 127. Authentication software 129 may include software for gathering information for use in authentication and/or for evaluating such information to determine authentication status, among other things. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a system and method for authenticating an application or SDK. In general, the system and method are configured for authenticating an application or SDK on one device, e.g., a user device, for communication with and/or accessing information from another device, e.g., a server. This authentication can be used to determine whether the application attempting to interact with the server is a genuine, authorized application or includes a genuine, authorized SDK embedded in a trusted application. In general, "authentication" as used herein refers to validating that the specific software interacting with the server (i.e., the application and/or SDK) and the environment in which the software is operating (i.e., the device) are configured in a trusted manner. In particular, the authentication may be used to detect one or more of the following: a genuine application that has been tampered with or modified, a genuine SDK embedded in a non-trusted application, a genuine application or embedded SDK in a device with malicious software installed, and direct attacks on the server. In one embodiment, the application or SDK may be authenticated for interaction with a server API. It is understood that, as used herein, authenticating an SDK operating within or otherwise in connection with an application may be considered to be "authenticating" that application as described herein.

Figure 2:
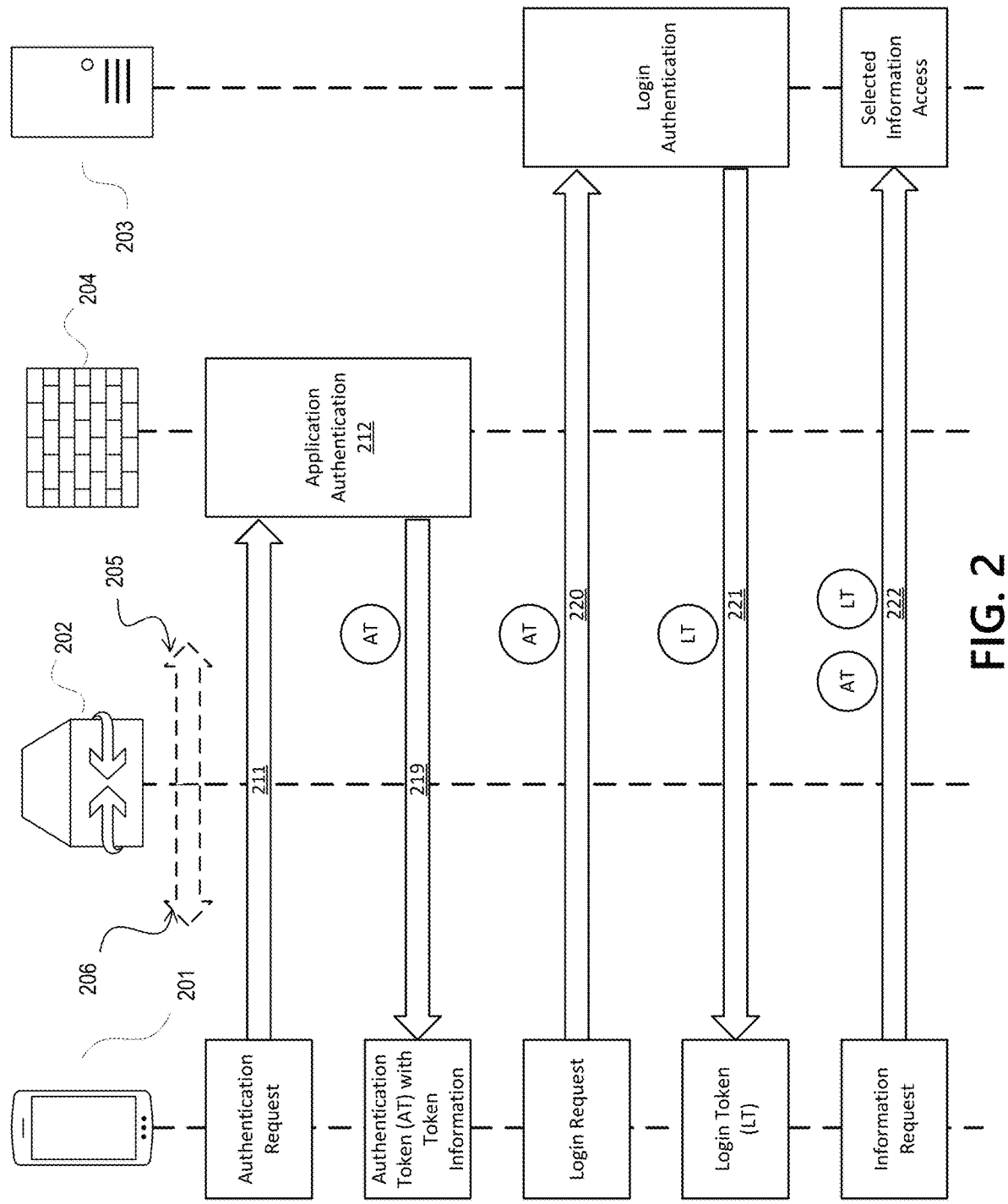
FIG. 2 depicts an example of a system architecture and method for providing access to information on a server by an application or SDK on a user device, including authentication, according to aspects of the disclosure.

FIG. 2 illustrates an overview of one embodiment of a method and system for providing access to information on a server by an application or an SDK on an external device (e.g., user device 201), including authenticating the device 201 and the application or SDK. The system includes at least the device 201 on a client side 206, and a gateway server 202, a server API 203 (e.g., a web server), and an authentication server 204 depicted as operating at the network edge on the server side 205. It is understood that the gateway server 202, the server API 203, and the authentication server 204 may be collectively or separately provided at the server side 205 by a single server or multiple servers working in conjunction, and that actions such as receiving, transmitting, evaluating, etc., performed at the gateway 202, server API 203, or authentication server 204 may be performed by the single server or one or more of the multiple servers. For example, the authentication server 204 and the server API 203 may be provided by the same server(s) or different servers in various embodiments. The method begins at 211 when the user device 201 transmits an authentication request that is received at the server side 205, i.e., the authentication server 204. In the embodiment illustrated, the authentication request does not pass the network edge, so that the authentication request is at least partially evaluated before the user device 201 is permitted access to the network.

Figure 3:
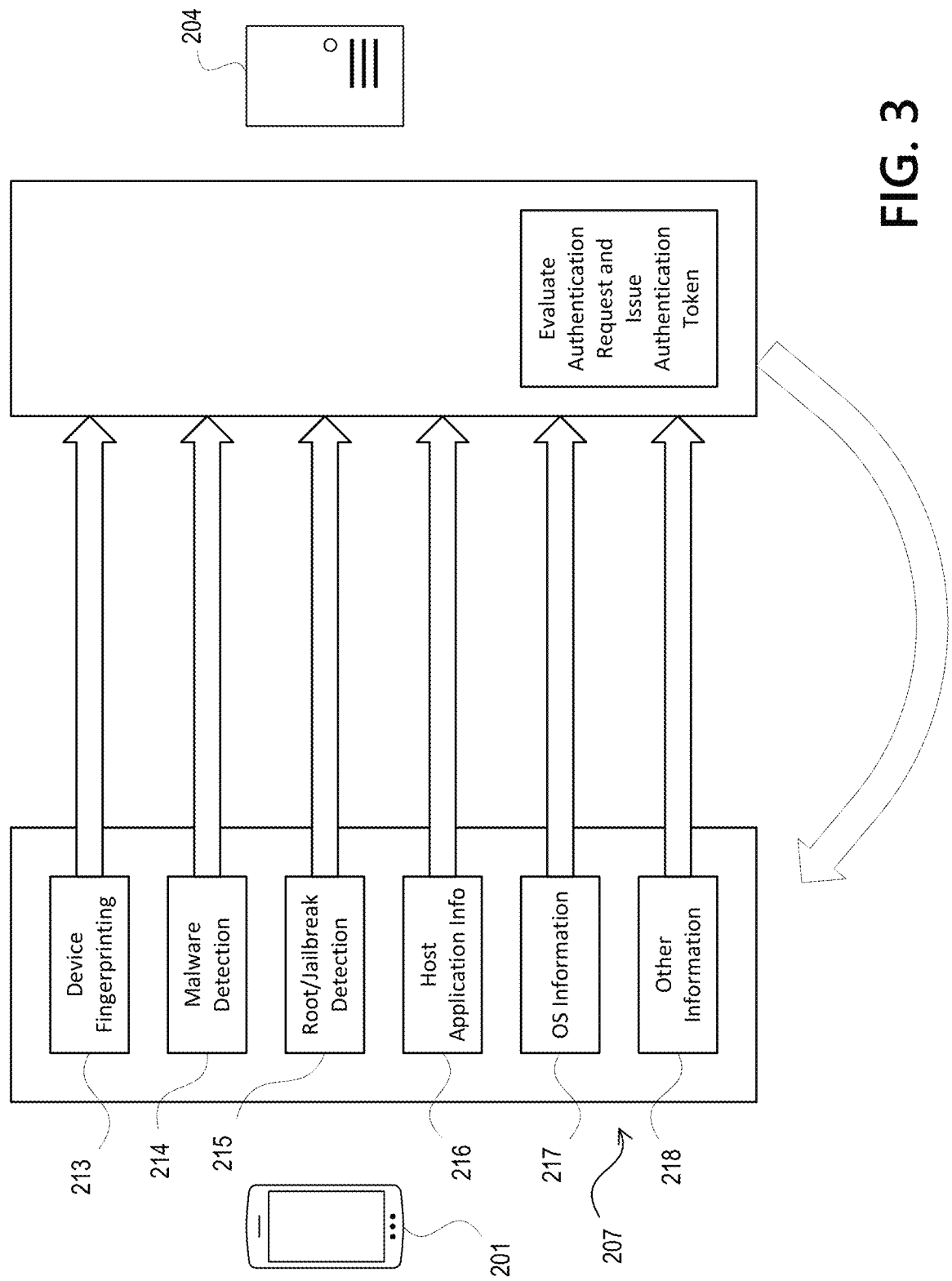
FIG. 3 depicts an example of a system and method for authenticating an application or SDK on a user device, according to aspects of the disclosure.

The authentication server 204 then evaluates the authentication request at 212. The evaluation may be based on one or more information items related to the user device 201 and/or the application for which authentication is requested. In one embodiment, the evaluation is based on a plurality of such information items from a plurality of different sources or channels, some or all of which are externally residing. Such different sources may be different applications/software residing externally to the computer devices on the server side 205, such as residing on the user device 201. The sources may also include checks on the operating system and/or privileged applications (e.g. those provided by the operating system or preloaded by a carrier or OEM) of the user device 201. Embodiments of methods for evaluating the authentication request are shown in FIGS. 3-6 and described in greater detail below. For example, FIG. 3 illustrates the authentication server 204 receiving a plurality of different information items 207 from different sources residing on the user device 201, including device fingerprinting information 213, malware detection information 214, access restriction circumvention information 215 (e.g., root/jailbreak information), host application information 216, operating system (OS) information 217, and other information 218. Device fingerprinting information 213 may include information regarding unique characteristics of the device 201, such as hardware information including device type, device capabilities, etc.; software information including the operating system, applications, plugins, fonts, and other installed software; user information; internet history and/or cookies; device configuration; information received from sensors, including physical location; and other types of information about the device 201. Malware detection information 214 includes identification of any potential malware installed or operating on the device 201, such as from malware detection software or from the operating system or OEM/carrier-installed apps. Access restriction circumvention information 215 includes information regarding whether a user has circumvented access and usage restrictions on the device, commonly referred to as "rooting" or "jailbreaking" the device. Access restriction circumvention may provide a user more freedom in using and configuring the device, but may also leave the device more vulnerable to attack by malware, hacking, etc. Host application information 216 may identify the application hosting an SDK, in order to determine whether a trusted SDK is embedded in an unauthorized application. Operating system information 217 may include information for the user device 201 such as an identity of the operating system, version, etc. Other information items 207 used in the analysis may include code obfuscation information, static analysis information, automated or manual penetration testing information, transport protection information, binary size information, and bot detection information. It is understood that any information items 207 received in this manner may be encrypted.

Certain information items 207 of the same type may be obtained from more than one different source in some embodiments, such as the device fingerprinting information 213, which may be obtained from at least first and second sources. In one embodiment, these multiple sources may provide the same type of information items 207 in different ways and/or with underlying information that is different in nature, quality, etc. For example, one source may provide such information quickly, with more superficial investigation and analysis, while another source may provide such information after a longer period of time, with deeper investigation and more thorough analysis. The system and method may utilize the same type of information from different sources in different ways and/or at different points in the authentication process. For example, the system and method may permit rapid, limited access after quick-return information is received that positively indicates authentication, and then re-evaluate the authentication request after slow-return information is received, to determine whether the authentication status has changed. An example of a process utilizing such a multi-part evaluation is described herein and shown in FIG. 5.

Figure 4:
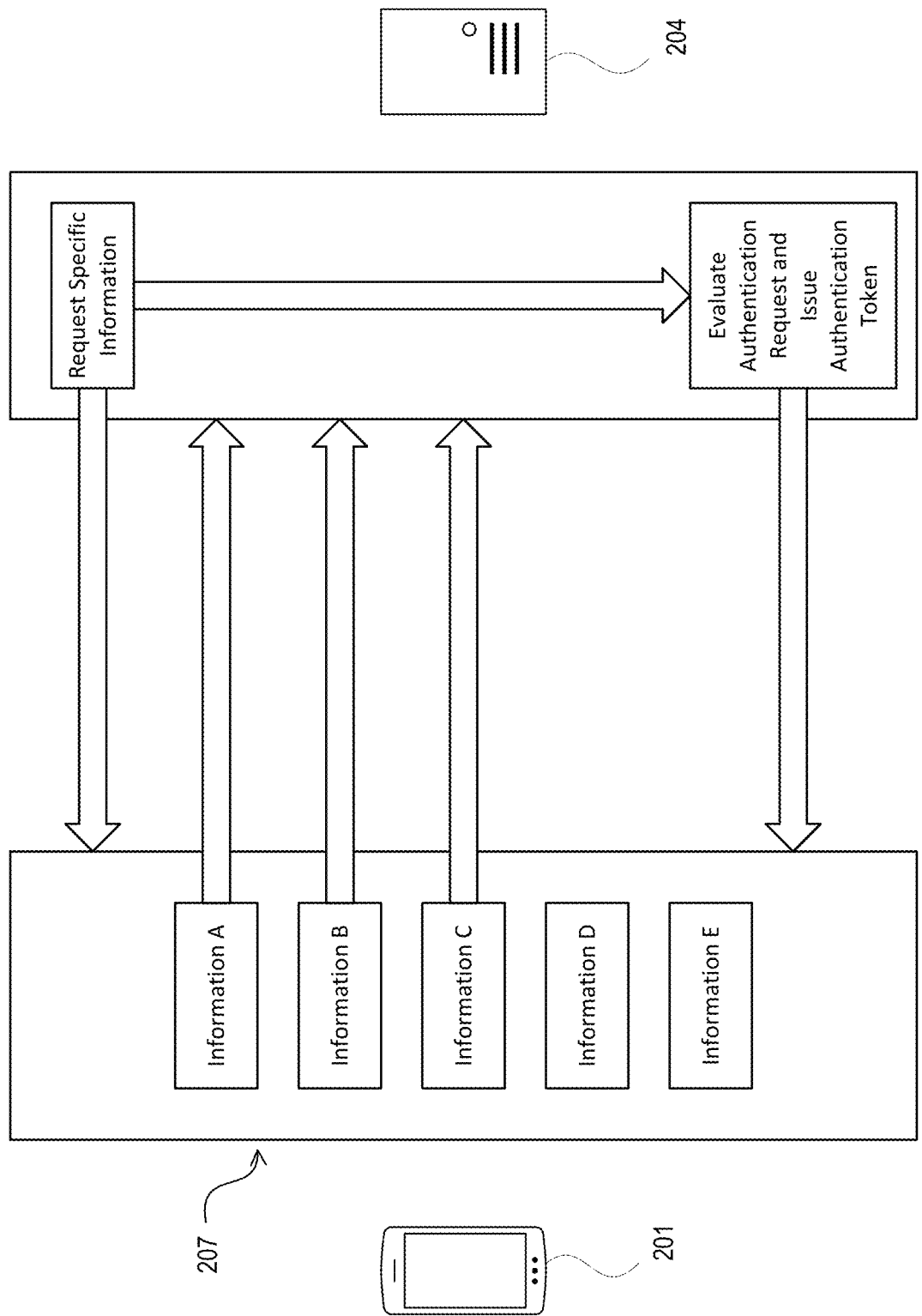
FIG. 4 depicts another example of a system and method for authenticating an application or SDK on a user device, according to aspects of the disclosure.

In one embodiment, the information items 207 are transmitted automatically when an authentication request is made. In another embodiment, the server 204 requests the information items 207 from the external device(s) and sources after the authentication request is received. As illustrated in FIG. 4, a plurality of different information items 207 may be available, and the server 204 requests specific information items 207 for use in evaluation.

Returning to FIG. 2, based on the evaluation 212, the authentication server 204 issues an authentication token AT to the user device 201 at 219, which is received and stored by the user device 201. The authentication token AT may be a temporary token that may expire, such as after a set period of time, after the end of the session, or based on other criteria. The authentication token AT in one embodiment includes token information based on the evaluation 212. For example, the token information may include information reflecting the authentication status, such as whether the application and/or the device 201 were determined to be authenticated, not authenticated, temporarily or partially authenticated, or designated as malicious, among others. It is understood that the authentication status may generally be considered to be "unauthorized" based on such results as the application and/or the device 201 not being found to be authenticated or being designated as malicious, among others. It is also understood that an "unauthorized" status may result in total denial of access to private or other user information and/or access to login procedures as described below. As another example, the token information may further include information indicating a degree of certainty that the application or the user device is compromised based on the evaluating each of the plurality of information items 207. A device or application/SDK is considered to be "compromised" if it is corrupted, such as through malware or other modification designed for malicious use, if it is actively being used for a malicious purpose, and also if it has been modified in a way that leaves it more vulnerable to malicious use (perhaps inadvertently). Such information indicating the degree of certainty may, in one embodiment, include a score generated using a scoring system for evaluation of the information items 207 as described herein. The scoring system may, for example, be configured such that a score at one end of the spectrum (e.g., a low score) indicates a high degree of certainty that the application or the user device 201 is compromised, and a score at the other end of the spectrum (e.g., a high score) indicates a high degree of certainty that the application or the user device 201 is authentic and not compromised. Viewed another way, the ends of the spectrum for the scoring system may indicate a degree of trustworthiness of the application or the user device 201, as a high degree of trustworthiness may be considered to reflect a high degree of certainty that the device 201 or application is not compromised. As another example, the token information may assign the application and/or the user device 201 a rank on a scale, such as high/medium/low risk, or unlikely/potential/likely/certain corruption or vulnerability. As another example, the token information may include information regarding specific characteristics of the device 201 or application, such as information resulting from the evaluation of one or more specific information items 207, e.g., the device is rooted or jailbroken, the device failed bot detection or malware detection, etc. As a further example, the token information may include information indicating how the device 201 or the application is to be treated by the server API 203 or another server on the server side 205. As yet another example, the token information may include device fingerprinting information for the device 201, in order to ensure that the authentication token AT has not been transferred.

If the application or SDK has been authenticated and received the authentication token with a positive authentication status, the user device 201 transmits a login request that is received by the server API 203, at 220. An authentication token AT with token information including a positive authentication status is necessary for communications from the user device 201 to pass the network edge to reach the server API 203 for login. The login request is accompanied with or followed by transmission of the authentication token AT and login credentials that are received at the server API 203. If the login credentials are correct, then the server API 203 transmits a login token LT that is received and stored by the user device 201, at 221. Like the authentication token AT, the login token LT may be temporary and may expired based on certain criteria. The login token LT may include additional token information in one embodiment, such as whether the login credentials were approved, or whether a specified maximum number of permissible failed login attempts was exceeded. At 222, the user device 201 is permitted to access information from the server API 203 only if the login token LT and the authentication token AT are confirmed and indicate positive login and authentication statuses. Confirming the login token LT and the authentication token AT may be performed by transmitting the actual tokens AT, LT or transmitting information sufficient to confirm receipt of the tokens AT, LT, which transmission may include some or all of the token information. The information access may include transmitting a request for information from the user device 201 to the server API 203, and then transmitting information from the server API 203 to the user device 201 in response to the request.

In another embodiment, the authentication procedures (e.g., 211, 212, 219) and the authentication token AT may be used to provide information without a login procedure or a login token LT. In such an embodiment, a method similar to that shown in FIG. 2 may be used, without transmitting the login request at 220 and transmitting the login token LT at 221. Permitting access to the information at 222 would be performed based on the authentication token AT and any corresponding token information, but not based on the login token LT or any corresponding token information in this embodiment.

The user device 201 may be permitted to have selected access to information through the server API 203. Such information may include private information, including financial and identifying information, such that users or customers benefit from the protections provided by the authentication described herein. The private information may include confidential or other protected information, sensitive information, or other information to which the user desires to limit access or would benefit from doing so. This information access by the user device 201 may be limited in some way based on the results of the authentication. In one embodiment, the access may be selectively limited based on the token information in the authentication token AT. For example, the user device 201 may be permitted to have partial or temporary access based on the token information, such as a score or designation indicating a potential risk, an indication that further authentication is proceeding, or an indication about the specific characteristics of the device 201 or application (e.g., root/jailbreak information). The selected access may be modified subsequently, such as by removing limits, adding limits, or completely denying access, based on further information received, such as described herein with respect to FIG. 5. The access may be provided to the user device 201 for a set time period or until occurrence of an event, such as logout, end of the session, changing of authentication status, etc.

Figure 5:
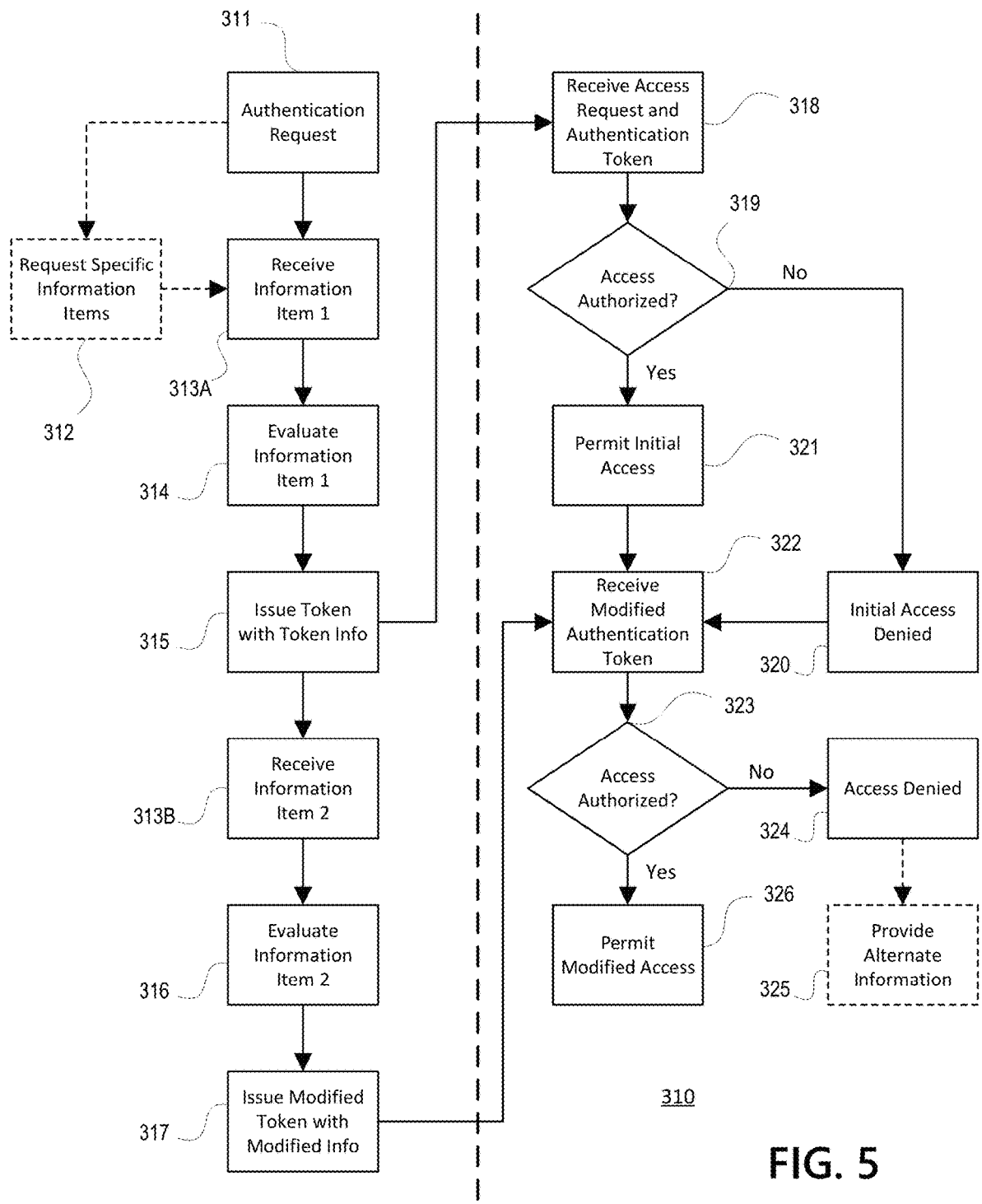
FIG. 5 depicts another example of a method for providing access to information on a server by an application or SDK on a user device including providing initial authentication and access subject to further evaluation, according to aspects of the disclosure.

In one embodiment, the user device 201 may be provided initial access that is subject to later modification based on additional information, and such initial access may be limited in some way. The additional information may be additional authentication information, such as a change in authentication status. For example, the user device 201 may be provided initial access that may be revoked after a subsequent negative change in authentication status after further evaluation. As another example, the user device 201 may be provided limited initial access based on an initial authentication status from initial authentication evaluation and may be subsequently provided with additional access based on further or complete authentication. The further authentication may be in the form of evaluation of further information items 207 or in the form of a different type of authentication (e.g., a multi-factor authentication or biometric authentication). FIG. 5 illustrates one embodiment a method 310 for authenticating an application (or an SDK embedded within the application) from the server side 205 perspective, where the user device 201 is provided initial authentication and access and later provided with modified authentication and access. It is noted that the broken line represents a division between the actions taken by the authentication server 204 and the actions taken at the server API 203, according to one embodiment.

In the method 310 of FIG. 5, an authentication request is received at 311, as similarly described herein, and a plurality of information items are received from a plurality of different sources in connection with the authentication request. The authentication server 204 may optionally request specific information items 207, as illustrated in FIG. 4 and described herein, at 312. As discussed herein, certain information items may be received at different times, due to faster or slower processing times by the information sources. Information items may be received individually and/or in groups or batches, e.g., multiple information items may be batched together in response to a single request. At least a first information item 207 is received at 313A and evaluated at 314, and an authentication token AT is issued to the user device 201, including token information, at 315, as described herein. At least a second information item is received at 313B and evaluated at 316 as described herein, which receipt and evaluation are completed after the initial authentication token AT is issued. After the evaluation of the second information item(s) 207 is completed, a modified authentication token AT is issued as described herein to the user device 201, at 317. The modified authentication token AT includes modified token information based on the evaluation at 316. As one example, the modified token information may include a modified authentication status, such as indicating that the application is no longer considered to be authenticated. As another example, the modified token information may include a different indication of the certainty that the user device 201 or the application is or is not compromised, such as a modified score based on the scoring system.

After the initial authentication token AT is issued at 315, the user device 201 may be permitted initial access based on the token information in the initial authentication token AT, before the modified authentication token AT is issued. The user device 201 transmits a request for access that includes the initial authentication token AT at 318, and a determination is made whether initial access is permitted based on the token information in the authentication token AT at 319. If the token information indicates that authentication has failed, e.g., the device 201 or application is compromised, the initial access is denied at 320. If the token information indicated that the authentication is successful, then initial access is permitted at 321. Subsequent to the initial access, the modified authentication token AT is received, along with the modified token information, at 322, and another determination is made regarding whether access is permitted based on the modified token information at 323. It is understood that the access decision may be re-evaluated at 323 if initial access was granted or if initial access was denied, in one embodiment. If the token information indicates that authentication has failed, access is denied at 324. Such access denial may be perpetual or temporary, and the authentication server 204 may alert other devices in the network that the user device 201 should be similarly denied access. If access is denied, alternate information may optionally be provided at 325. Such alternate information may include modified or redacted data based on an uncertain authentication status. In one embodiment, such alternate information may only be provided if the token information indicates that the device 201 and/or application are being used for malicious attack. If the modified token information indicated that the authentication is successful, then initial access is permitted at 326. The modified access may include a greater degree of access if the modified token information indicates a greater degree of certainty that the device 201 or the application is not compromised. It is understood that the modified token information may not indicate that any modification to the initial access is necessary, under some circumstances.

The use of initial and modified access based on further evaluation of the information items 207 may improve access speed of the user device 201, thereby improving the user experience, without adversely affecting security. In one embodiment, the initial access is based on evaluation of information items 207 that are received more quickly from the external sources, which in some circumstances may be a result of more superficial and/or less detailed analysis. In this configuration, the user device 201 may be permitted access to the private information prior to all of the information items being evaluated. The user device 201 can therefore be provided access more quickly if the initial evaluation indicates that authentication is successful. The later-received information items 207 may in some circumstances relate to deeper investigation and/or more detailed analysis, and may therefore be considered to be more reliable determiners of whether authentication should be granted. If the modified token information indicates that access is still permitted, the user may continue with access without the experience being negatively affected. If, however, the modified authentication information indicates that the initial decision to permit access was incorrect, the access can be modified or denied. In some circumstances, the later-received information items 207 may be received only seconds (or fractions of a second) after the earlier-received information items 207. Thus, if the authentication is used in connection with a login process, it is understood that the initial access may simply include access past the network edge to begin the login process in one embodiment, and no private user information may be transmitted before the final/later authentication is completed. In another embodiment, the user device 201 may be provided initial access to a limited amount of information (e.g., less sensitive information), while the modified access may permit access to an increased amount of information. In a further embodiment, evaluation of one or more information items 207 may be generally required for access, while evaluation of one or more other information items 207 may only be required based on additional criteria, such as time spent accessing information, depth or content of information access, the identity of the device 201, the location of the device 201, etc.

Figure 6:
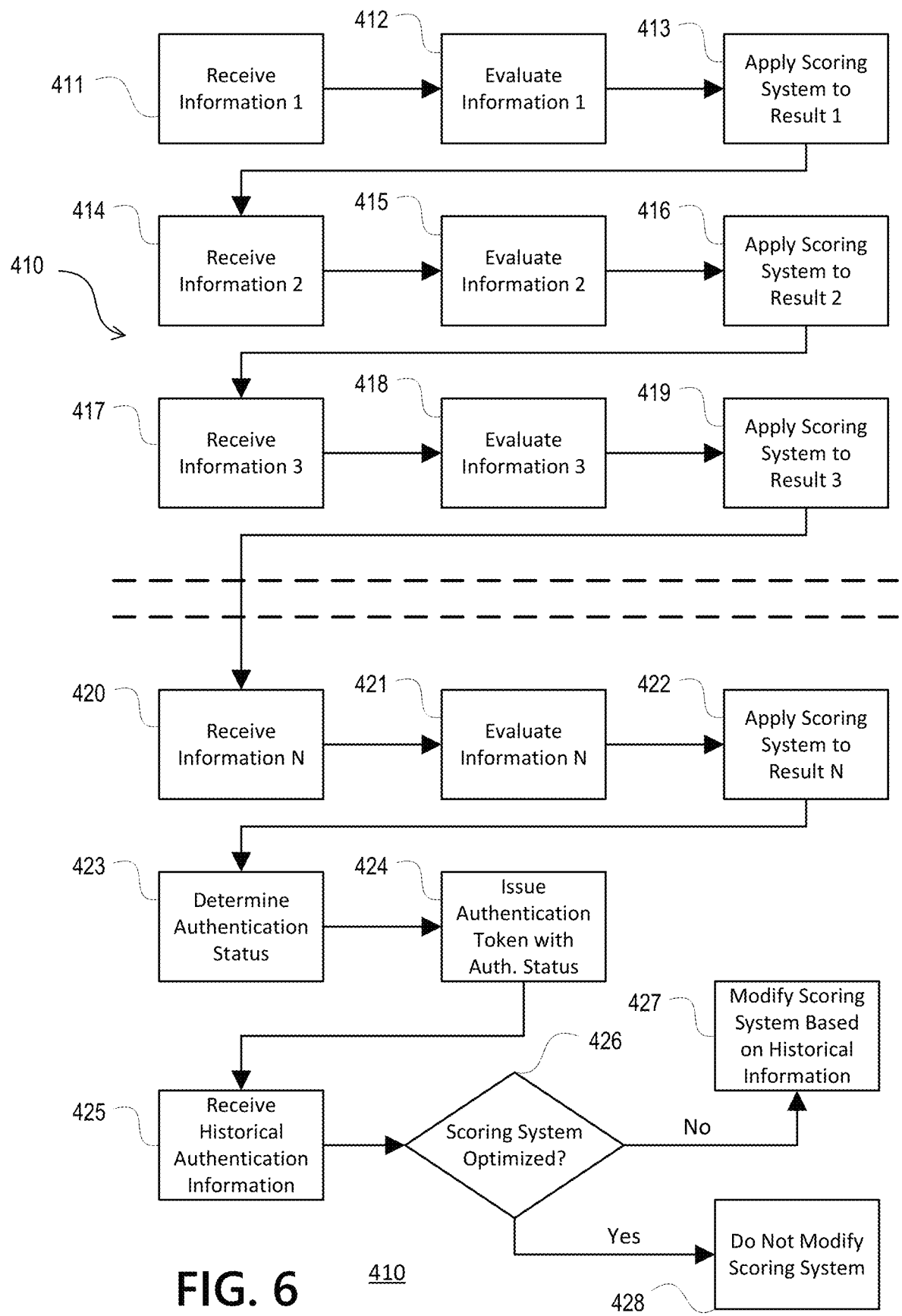
FIG. 6 depicts another example of a method for evaluating an authentication request using a scoring system, and optimizing the scoring system, according to aspects of the disclosure.

FIG. 6 illustrates one embodiment of a method 410 for evaluating an authentication request using a scoring system that is applied to a plurality of information items 207, where the scoring system is modified or optimized based on historical data. Such a scoring system may be weighted based on the type of information item 207 and/or the source of the information item 207 (e.g., some sources may be considered to be more reliable indicators). Such a scoring system may also be weighted based on the content of a particular information item 207, because a specific information item 207 may be a strong or conclusive indicator or a weak indicator based on the content thereof. For example, a device 201 receiving a passing result from malware detection software may not be a particularly strong indicator that authentication should be granted, but a device 201 receiving a failing result from malware detection software may be an extremely strong (or even conclusive) indicator that authentication should not be granted. In one embodiment, the scoring system is configured such that the authentication status may be determined to be "unauthorized" solely on the basis of one or more information items 207 indicating that the device 201 and/or application/SDK is compromised, including at least the device fingerprinting information and the malware detection information. The historical data may include a historic success rate of correctly identifying authentic or compromised devices 201 and applications/SDKs. The information items 207 are received, such as from an external device as described herein, and may be received simultaneously or at different times, as also described herein. A first information item 207 is received at 411 and evaluated to determine its contents at 412, and the scoring system is then applied to the first information item 207 (including any applicable weighting factor) at 413. The same process repeats for a second information item at 414-416 and a third information item at 417-419, until the final information item at 420-422. It is understood that the scoring system may be applied to the information items 207 sequentially as they are received and evaluated, or may be applied to all of the information items together after all are received and evaluated.

After all information items are evaluated and scored, the authentication status is determined based on the score at 423, and an authentication token AT is issued at 424 including the authentication status, and potentially the score, as well as other information. The evaluation of the authentication request may be considered complete after the authentication token AT is issued at 424. In one embodiment, the method 410 may further include optimization of the scoring system, which may occur before, after, or during the steps 411-424. In the embodiment illustrated in FIG. 6, the optimization is performed by receiving historical authentication information as described herein at 425, which may include past authentication results, the information items 207 used in evaluation of the past results, and data regarding the success rate or accuracy of such past authentication results, among others, which data may be internally stored or received from an external source. The scoring system is then analyzed for optimization at 426, which may utilize machine learning. The modification analysis may include comparison of one or more potential new scoring systems to the historical dataset to determine if a better result (e.g., more accurate identification) results from the potential new scoring system(s). Such new scoring system(s) may include different weighting factors for various information items 207 and/or consideration of a larger or smaller number of information items 207, among other potential modifications. If the scoring system can be improved by modification, then the scoring system is automatically modified at 427, with the modified scoring system applied to future authentication requests. If the scoring system cannot be significantly improved by modification, then the scoring system is not modified, at 428. It is understood that the modification process 425-428 can be running continuously in one embodiment, and the modification process need not be tied to evaluation of a particular authentication request.

In another embodiment, historical authentication information may be used to assign a confidence level to an authentication status. For example, the historical success rate of correct authentication based on the same or similar information items 207 may be used to assign such a confidence level. The confidence level may comprise a score that is included in the token information of the authentication token AT, and the confidence level may govern any limits on the selected access to the information or whether or not access is provided at all.

It is understood that this method 410 may be used in connection with any of the authentication methods described herein. For example, the method 410 may be used in connection with evaluating the authentication request 212 in FIG. 2 or evaluating the authentication request in FIGS. 3-4. As another example, the method 410 of FIG. 6 (or another embodiment using a scoring system) may be used in connection with a multi-step authentication process such as shown in FIG. 5 and described herein. In such an embodiment, the initial authentication token AT may include token information based on the initial score calculated before receipt and evaluation of the later-received information items, and the score may be updated after evaluation of the later-received information items, with the modified authentication token AT including modified token information based on the updated score.

In a further embodiment, a third party associated with an application is provided the ability to select authentication parameters and rules for use with their application, e.g., the user, or an external operator of an application configured to access and interact with the server API 203 or including an SDK configured for such access. These authentication parameters may include a selection of the types and/or sources of information used in evaluating the authentication request, the weighting to apply in the scoring system for various types of information, rules for approving or denying authentication requests, etc. The authentication process may proceed according to these selected authentication parameters. In one example, the third party may select the types and sources of information used in evaluating the authentication request, and the server 204 may request only the selected types of information from only the selected external sources. Certain types and sources may be indicated as required, optional, or not used. In another example, the operator may select the weighting to apply in the scoring system, and the server 204 will then evaluate the authentication request using a scoring system modified by the operator selections. In a further example, the third party may select one or more rules for approving or denying authentication requests, e.g., which operating systems may be used or whether rooted/jailbroken devices may be allowed access, and the server 204 will permit or deny access based on such rules. Such rules may also govern a degree of access provided to the user device 201 based on the results of the authentication. In a particular example, the third party may have the ability to determine a degree of access given to a device 201 that is determined to have access restrictions circumvented (i.e., rooted or jailbroken). It is understood that, in some embodiments, not all parameters may be open to user selection and/or selections with respect to certain parameters may be limited. It is also understood that the method may include receiving instructions from the third party that include such rules and parameters selected by the third party.

Various embodiments of systems and methods for authentication of an application or SDK embedded within the application have been described herein, which include various components and features. In other embodiments, the systems and methods may be provided with any combination of such components and features, and the steps of the methods of FIGS. 2-6 can be used together in any combination that is practicable. For example, one skilled in the art would recognize that any or all of the specific steps of the authentication methods of FIGS. 5-6 may be used as part of the evaluation of the authentication request shown at 212 in FIG. 2 or at 314 in FIGS. 3-4.

The systems, methods, and computer program products described herein produce advantages over existing technologies. For example, aspects described herein provide a reliable and predictable technique for authenticating both applications and SDKs to avoid interaction with compromised devices and software. As another example, aspects described herein provide application operators and/or users the ability to customize the policies and security that they desire. As a further example, the use of multiple external information sources increases the variety of harmful corruptions or indicators of compromising that may be found on the user device. As an additional example, aspects described herein provide increased speed of access for users while still providing thorough authentication evaluation. As yet another example, aspects described herein provide better optimized authentication performance, as well as more intelligent response to potential threats. Still further benefits and advantages are recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The use of "including," "having," and "comprising," and variations thereof is meant to encompass the items listed thereafter and equivalents thereof as well as additional items and equivalents thereof. When used in description of a method or process, the term "providing" as used herein means generally making an article available for further actions, and does not imply that the entity "providing" the article manufactured, assembled, or otherwise produced the article. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A computer-implemented method comprising:
receiving, at a computing device, an authentication request from an external device for authenticating an application on the external device;
receiving, at the computing device, a plurality of information items from a plurality of different externally residing information sources, wherein the plurality of information items comprises device fingerprinting information for the external device, malware detection information for the external device, and access restriction circumvention information for the external device;
evaluating the authentication request, at the computing device, including evaluating each of the plurality of information items using a scoring system, to determine an authentication status of the application;
issuing an authentication token to the external device, wherein the authentication token includes token information reflecting the authentication status and indicating a degree of certainty that the application or the external device is compromised based on the evaluating each of the plurality of information items;
receiving login information and the authentication token from the external device for a user of the external device;
issuing a login token to the external device in response to the receiving the login information and the authentication token;
receiving, from the external device,
a request for access to private information,
and a confirmation of the authentication token and the login token;
and selectively permitting a degree of access to private information by the external device through the application, based on the received confirmation of the authentication token and the login token, and the authentication status and the degree of certainty that the application or the external device is compromised.

2. The computer-implemented method of claim 1, wherein the application comprises a software development kit (SDK).

3. The computer-implemented method of claim 1, wherein the computing device is an API server and wherein the private information comprises financial information of a user of the external device.

4. The computer-implemented method of claim 1, further comprising receiving historical information regarding past authentication requests and modifying
the scoring system based on the historical information.

5. The computer-implemented method of claim 1, wherein the scoring system is configured such that the authentication status is determined to be authorized based on the device fingerprinting information and the malware detection information indicating that the application and the external device is not compromised, and the external device is permitted access to the private information based on the authorized authentication status.

6. The computer-implemented method of claim 1, wherein the external device is permitted the degree of access to the private information prior to evaluation of all of the plurality of information items, and wherein the method further comprises modifying the authentication status after the external device is permitted the degree of access to the private information.

7. The computer-implemented method of claim 6, wherein the method further comprises modifying the degree of access to the private information by the external device based on modifying the authentication status.

8. The computer-implemented method of claim 1, wherein a first item of the plurality of information items is received from a first externally residing information source, and a second item of the plurality of information items is received after the first item from a second externally residing information source, wherein the external device is permitted the degree of access to the private information after evaluation of the first item and before evaluation of the second item.

9. The computer-implemented method of claim 8, further comprising modifying the authentication status after the external device is permitted the degree of access to the private information and after evaluation of the second item and modifying the degree of the access to the private information by the external device based on modifying the authentication status.

10. The computer-implemented method of claim 8, wherein access to a first portion of the private information is permitted without evaluation of the second item, and access to a second portion of the private information is only permitted after evaluation of the second item.

11. The computer-implemented method of claim 1, wherein at least one of the externally residing information sources resides on the external device, such that at least one of the plurality of information items is received from the external device.

12. The computer-implemented method of claim 1, further comprising receiving, at the computing device, from a third party associated with the application, instructions determining the degree of access to selectively provide to the external device when the access restriction circumvention information indicates that access restriction for the external device has been circumvented.

13. A computer system comprising:
one or more processors; and
memory storing instructions that, when executed by the one or more processors, cause the system to:

receive an authentication request from an external device for authenticating an application on the external device;

evaluate the authentication request including evaluating a plurality of information items from a plurality of different externally residing information sources using a scoring system to determine an authentication status of the application, the plurality of information items including at least one characteristic of the external device;

issue an authentication token to the external device the authentication token including token information reflecting the authentication status and indicating a degree of certainty that the application or the external device is compromised based on the evaluating the authentication request;

receive login information and the authentication token from the external device for a user of the external device;

issue a login token to the external device in response to the receiving the login information and the authentication token;

receive, from the external device,
 a request for access to private information, and
 a confirmation of the authentication token and the login token; and selectively permit a degree of access to the private information by the external device through the application, based on the received confirmation of the authentication token and the login token, and the authentication status and the degree of certainty that the application or the external device is compromised.

14. The computer system of claim 13, wherein the at least one characteristic of the external device comprises device fingerprinting information for the external device, malware detection information for the external device, and access restriction circumvention information for the external device.

15. The computer system of claim 13, wherein the authentication token includes token information reflecting the authentication status.

16. The computer system of claim 13, wherein the instructions, when executed by the one or more processors, cause the system to receive historical information regarding past authentication requests and to modify the scoring system based on the historical information.

17. A non-transitory machine-readable medium storing instructions that, when executed by one or more processors, cause the one or more processors to perform steps comprising:

receiving an authentication request from an external device for authenticating an application on the external device;

receiving a plurality of information items from a plurality of different externally residing information sources, the plurality of information items including at least one characteristic of the external device;

evaluating the authentication request, including evaluating each of the plurality of information items using a scoring system, to determine an authentication status of the application;

issuing an authentication token to the external device, the authentication token including token information reflecting the authentication status and indicating a degree of certainty that the application or the external device is compromised based on the evaluating each of the plurality of information items;

receiving login information and the authentication token from the external device for a user of the external device;

issuing a login token to the external device in response to the receiving the login information and the authentication token;

receiving, from the external device,
 a request for access to private information, and
 a confirmation of the authentication token and the login token; and providing a selected degree of access to the private information by the external device through the application, based on the confirmation of the authentication token and the login token, and the authentication status and the degree of certainty that the application or the external device is compromised.

18. The non-transitory machine-readable medium of claim 17, wherein the instructions, when executed by one or more processors, cause the one or more processors to perform evaluating each of the plurality of information items including access restriction circumvention information, and receiving, from a third party associated with the application, instructions determining the selected degree of access to provide to the external device when the access restriction circumvention information indicates that access restriction for the external device has been circumvented.

* * * * *